Sept. 5, 1950    J. E. BODELL    2,521,333
WALLPAPERING MACHINE
Filed March 11, 1948    2 Sheets-Sheet 1
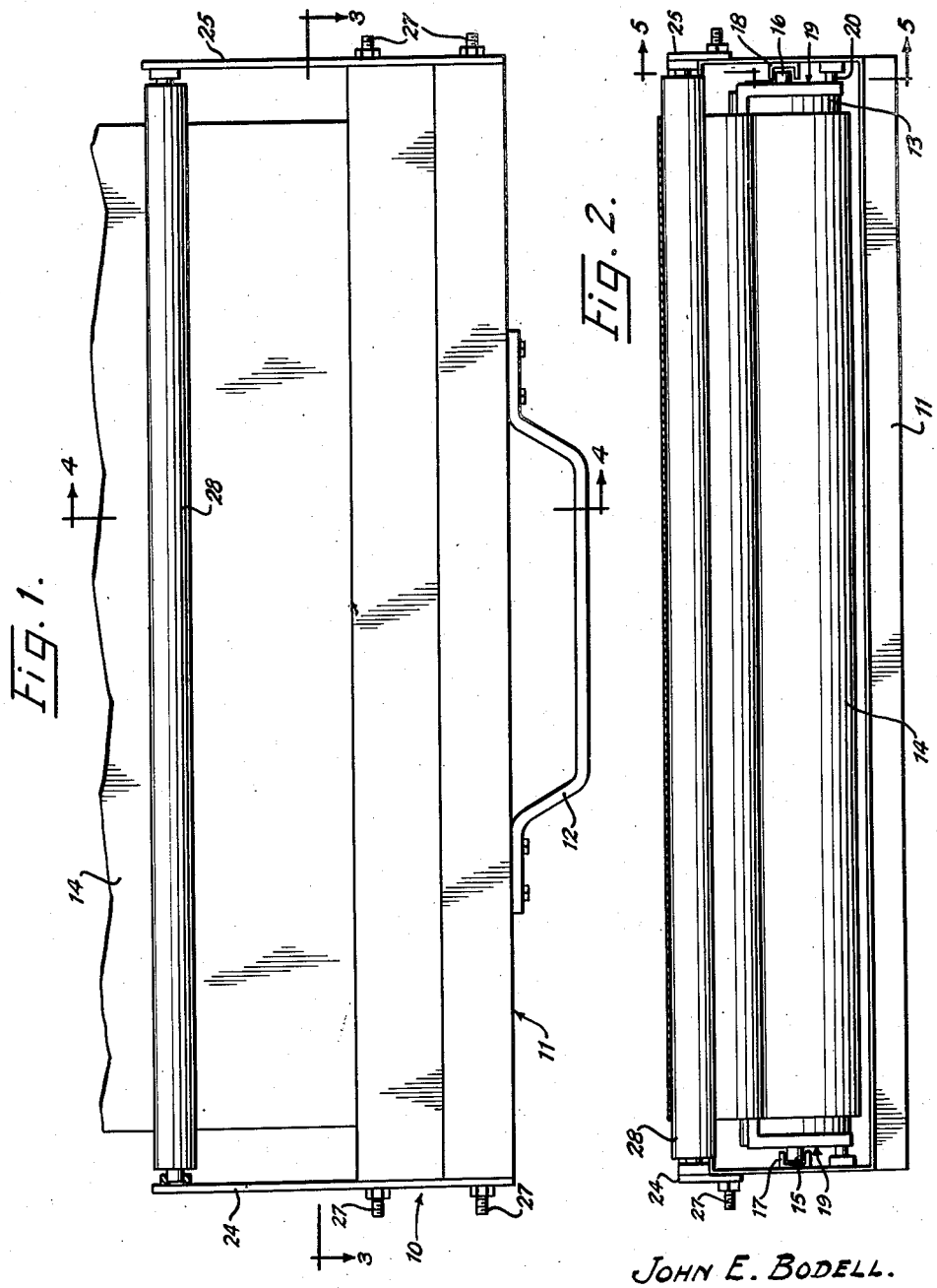
JOHN E. BODELL,
INVENTOR.
BY Thomas F. Healy
Attorney Sept. 5, 1950     J. E. BODELL     2,521,333
WALLPAPERING MACHINE
Filed March 11, 1948     2 Sheets-Sheet 2
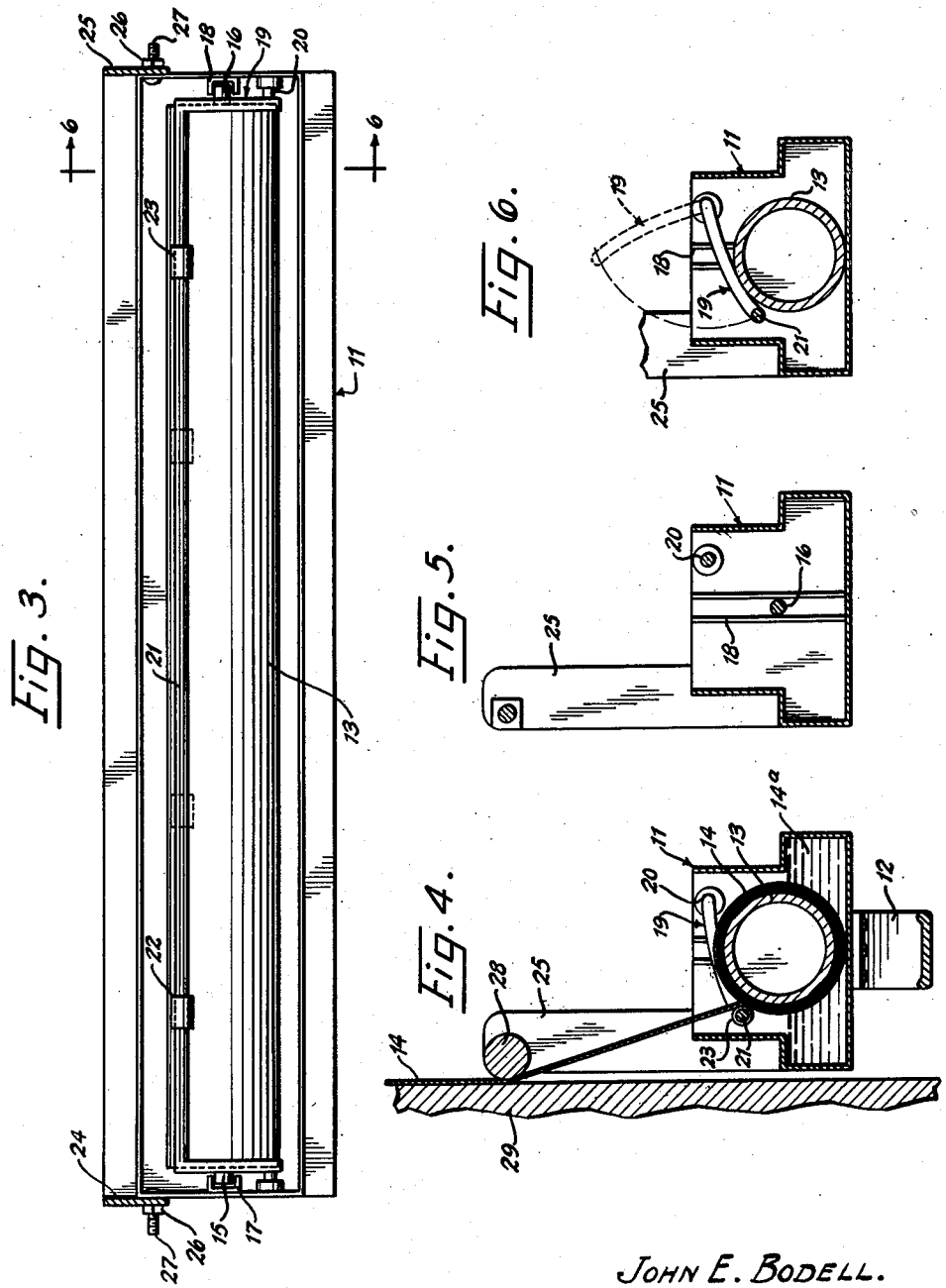
John E. Bodell.
INVENTOR.
BY Thomas F. Healy
Attorney Patented Sept. 5, 1950

2,521,333

UNITED STATES PATENT OFFICE 2,521,333

WALLPAPERING MACHINE

John E. Bodell, Fremont, Nebr.

Application March 11, 1948, Serial No. 14,206

2 Claims. (Cl. 91—62.5)

The present invention relates to a papering machine, and more particularly to a portable machine for papering walls and ceilings.

The primary object of the present invention is to provide an inexpensive wallpapering machine which is lightweight and easy to handle and operate.

Another object is to provide a wallpapering machine wherein the wallpaper picks up paste directly from a past trough with additional means being provided to regulate the thickness of the coat of paste adhering to the wallpaper.

In one of its aspects, the present invention embraces a portable wallpapering machine comprising, a receptacle adapted to hold paste, a roller element rotatably and removably secured within said receptacle and adapted to hold wallpaper thereon with the wall side outwardly, a swingable element pivotally carried by said receptacle and including a rod extending lengthwise of said roller, said swingable element being swingable into and out of said receptacle, means carried by said rod and adapted to contact the pasted side of the wallpaper being removed from said roller to regulate the paste adhering to the paper by spacing said rod a predetermined distance from said paper, and additionally including a handle secured to said receptacle.

Other objects and advantages of the present invention will be apparent from the following description thereof and from the claims appended thereto.

In the drawing wherein like numerals refer to like or corresponding parts throughout the several views;

Figure 1 is a front elevation of the wallpapering machine embodying the features of the present invention;

Figure 2 is a top plan view of the wallpapering machine shown in Figure 1;

Figure 3 is a sectional view taken along the line 3—3 of Figure 1, in the direction of the arrows;

Figure 4 is a sectional view taken along the line 4—4 of Figure 1, in the direction of the arrows, and showing the wallpaper being applied to a wall;

Figure 5 is a sectional view taken along the line 5—5 of Figure 2, in the direction of the arrows; and Figure 6 is a sectional view taken along the line 6—6 of Figure 3, in the direction of the arrows.

Referring to the drawing, the numeral 10 generally represents the wallpapering machine which embodies the features of the present invention, and comprises a substantially rectangularly shaped paste receptacle 11 provided with upstanding front and rear walls and oppositely disposed end walls. The receptacle 11 is of such dimensions that it may conveniently hold sufficient paste to coat one roll of wallpaper for papering purposes. Said receptacle 11 may be made of any desired material, but it is preferred that it be made of lightweight metal or alloy, or plastic. A handle 12 is secured to the underside of the receptacle 11 in any convenient manner as by nuts and bolts. Within the receptacle 11 there is positioned a roller 13 which has tightly wound thereon wallpaper 14 with the wall side outwardly.

The roller 13 is rotatably and removably secured within the paste receptacle 11 in any convenient manner, as for example by having the roller 13 provided with stubs 15 and 16 on the opposite ends of said roller 13, which stubs 15 and 16 are disposed in guide elements 17 and 18 respectively, which are secured to the inner sides of the opposite end walls of the receptacle 11 in any suitable manner, as by soldering or the like. The guide elements 17 and 18 are of such dimensions that the roller 13 may be moved vertically out of the receptacle 11 but yet is free to rotate therein, so that the wallpaper 14 can be covered with paste 14a as it is removed from the roller 13.

A swingable element 19 is pivotally secured within the receptacle 11 by having its free end portions journaled in bearings 20 attached to the opposite inner sides of the end walls of receptacle 11. Swingable element generally indicated as 19 includes a rod 21 which extends lengthwise of roller 13 within the receptacle 11, said swingable elements 19 being adapted to be swung into and out of said receptacle 11, as best shown in Figure 6 of the drawing. The rod 21 rotatably carries a pair of ring elements 22 and 23 which are spaced apart from each other and are slidable on the rod 21. The rings 22 and 23 are of such a thickness that when they contact the wallpaper 14 which is being removed from the roller 13, there is provided a space between the wallpaper which has picked up the paste and the rod 21 so that the said rod 21 serves as a scraper element to regulate the thickness of the coat of paste adhering to the wall side of the wallpaper 14 being removed from roller 13. This feature is important as roller rings of different dimensions may be selectively employed to increase or decrease the amount of paste adhering to the wallpaper after it has passed rod 21. It is to be understood that any suitable means may be employed to space the rod 21 a predetermined distance from the wallpaper 14 which is being removed from roller 13, first passing through the trough of paste 14a.

Support elements 24 and 25 are suitably secured to the opposite end walls of the rectangularly shaped paste receptacle 11 in any suitable manner as by nuts and bolts 26 and 27. The support elements 24 and 25 extend upwardly and at the free end portions thereof rotatably carry a roller 28 in a conventional manner. The roller 28 is of importance in smoothing the paper 14 on the wall 29.

In operation, the receptacle 11 of the wallpapering machine 10 is filled with paste 14a of a suitable consistency. The roller 13 has wallpaper 14 tightly wound thereon with the wall side outwardly. It is preferred that the wallpaper 14 be very tightly wound on roller 13 so that paste will not seep into the end portions thereof. The roller 13 carrying wallpaper 14 is now disposed within the receptacle 11 by sliding the stubs 15 and 16 in guide elements 17 and 18, so that the wallpaper rests against the bottom of the receptacle 11 in paste 14a. The wallpaper 14 is then placed in contact with roller ring elements 22 and 23 disposed on rod 21 so that said rod 21 is spaced slightly from the wallpaper 14 being removed. As the wallpaper 14 is unrolled from roller 13, it picks up paste 14a, and as the wallpaper 14 passes the rod 21, excessive paste is removed. The pasted wallpaper is now ready for papering operation on wall 29, and it is preferably disposed in such a manner with relation to roller 28 that roller 28 may be employed to smooth wallpaper 14 on wall 29.

If desired, roller 28 and supporting elements 24 and 25 may be eliminated, but it is preferred to employ roller 28 to make a very smooth operation.

After all the wallpaper has been unwound from roller 13, said roller 13 is removed from within the receptacle 11, suitably cleaned and more wallpaper rolled thereon. At this time paste 14a is replenished and with the introduction of a new roll of wallpaper within the receptacle 11, the device is again ready for operation.

The various elements which make up the wallpapering machine embodying the features of the present invention may be composed of any suitable material, but preferably a lightweight metal. The elements may be any suitable size or dimensions depending upon the use to which the machine is to be put. I have found that if the receptacle 11 is approximately twenty inches long, four inches wide and three inches high (20" l. x 4" w. x 3" h.), it will hold a sufficient amount of paste to coat a roll of wallpaper approximately twenty-five feet long (25' l.). I have also found that the diameter of the roller within the paste receptacle should preferably be approximately 1¾" to 2", so that the top level of the paste is below the point that the wallpaper leaves the roller.

Various modifications of the present invention will be apparent to those skilled in the art without departing from the spirit thereof, and it is therefore desired to be limited only by the scope of the appended claims.

What I claim is:

1. A portable wallpapering machine comprising, a substantially rectangular paste receptacle having upstanding walls, a roller within said receptacle adapted to hold wallpaper thereon with the wall side outwardly, said roller being journaled in a guide element for said roller disposed on each inner side of the end walls of said receptacle, said roller being adapted to be removed from said receptacle, a swingable element pivoted to the inner end walls of said receptacle and including a rod extending lengthwise of said roller within said receptacle, said swingable element being swingable into and out of said receptacle, means carried by said rod and adapted to contact the pasted side of the wallpaper being removed from said roller to regulate the paste adhering to the paper by spacing said rod a predetermined distance from said paper, and a handle secured to said receptacle.

2. A portable wallpapering machine comprising, a receptacle adapted to hold paste, a roller rotatably and removably secured within said receptacle and adapted to hold wallpaper thereon with the wall side outwardly, a swingable element pivotally carried by said receptacle and including a rod extending lengthwise of said roller, said swingable element being swingable into and out of said receptacle, means carried by said rod and adapted to contact the pasted side of the wallpaper being removed from said roller to regulate the paste adhering to the paper by spacing said rod a predetermined distance from said paper, and a handle secured to said receptacle.

JOHN E. BODELL.

REFERENCES CITED

The following references are of record in the file of this patent:

UNITED STATES PATENTS

| Number | Name | Date |
|---|---|---|
| 349,531 | Sherck et al. | Sept. 31, 1886 |
| 481,251 | Barton | Aug. 23, 1892 |
| 662,606 | Stanley | Nov. 27, 1900 |
| 1,084,964 | Richardson | Jan. 30, 1914 |
| 1,285,384 | Reynolds | Nov. 19, 1918 |